United States Patent [19]

Black

[11] Patent Number: 4,561,626
[45] Date of Patent: Dec. 31, 1985

[54] MOLD OPENING DEVICE

[75] Inventor: John W. Black, Hickory Corners, Mich.

[73] Assignee: Pemco-Kalamazoo, Inc., Kalamazoo, Mich.

[21] Appl. No.: 664,818

[22] Filed: Oct. 25, 1984

[51] Int. Cl.⁴ ............................ B29C 1/16; B29F 1/022
[52] U.S. Cl. .................................... 249/118; 249/166; 249/167; 425/190; 425/214; 425/541; 425/577; 425/588; 425/595; 425/450.1; 425/451.9
[58] Field of Search ............ 425/182, 190, 214, 450.1, 425/451.9, 541, 588, 595, 575, 577; 249/67, 68, 160, 163, 165, 166, 167, 118, 161

[56] References Cited

U.S. PATENT DOCUMENTS

| | | | |
|---|---|---|---|
| 2,555,476 | 6/1951 | DuBois et al. | 425/190 |
| 4,025,264 | 5/1977 | Hehl | 425/190 |
| 4,080,144 | 3/1978 | Hehl | 425/595 |
| 4,094,621 | 6/1978 | Hehl | 425/190 |
| 4,105,390 | 8/1978 | Hehl | 425/450.1 |
| 4,111,623 | 9/1978 | Black | 425/117 |
| 4,248,583 | 2/1981 | Hedke et al. | 425/450.1 |
| 4,315,727 | 2/1982 | Black | 425/595 |
| 4,372,738 | 2/1983 | Black et al. | 425/595 |
| 4,424,015 | 1/1984 | Black et al. | 425/576 |

Primary Examiner—Willard E. Hoag
Attorney, Agent, or Firm—Flynn, Thiel, Boutell & Tanis

[57] ABSTRACT

A mold structure having at least first, second and third mold parts stacked one on top of the other, each having structure thereon defining at least one part of a mold cavity. The second part is oriented between the first and third parts and has mold cavities on both sides thereof. A support structure is provided for supporting the first mold part for movement toward and away from the third mold part. Structure is included within the mold structure to limit the spacing between the first and second mold parts to a prescribed spacing so that as the first mold part is moved away from the third mold part, the second mold part will be spaced a prescribed distance away from both the first and third mold parts.

The invention also includes a mold opening structure which is coaxially aligned with the elongate tie rod extending between the mold parts. This structure further effects a safe and positive opening of the mold structure.

14 Claims, 9 Drawing Figures

MOLD OPENING DEVICE

FIELD OF THE INVENTION

This invention relates to a mold opening device and, more particularly to a device for predetermining the spacing between separated mold parts during a mold opening operation, a device for effecting a separation of the mold parts as well as a device for effecting a locking and an unlocking of a plurality of mold parts.

BACKGROUND OF THE INVENTION

The improved lock mechanism of the present invention arose out of the need to securely lock a plurality of parts of an injection mold together against the high pressure generated during injection and curing of a thermoplastic or similar material, which pressure can easily generate forces exceeding 25 tons. Further, there was a necessity to assure a positive and safe separation of the plural mold parts to enable retrieval of a molded product and to prevent an accidental and/or rapid closing of the mold onto the hands and/or hand held tool of any operator that may have become placed between the separated mold parts. Further, the present invention also arose out of a need to enable the mold parts to be placed into an unlocked condition prior to any mold opening process and by structure that would readily cooperate with different ones of the plural mold housing structures mounted on the same turntable.

It is now a known technique to mount a plurality of injection molds at spaced intervals about the periphery of a rotatable turntable. For example, such machines are disclosed in U.S. Pat. Nos. 4,111,623 and 4,424,015. Further, mechanisms for locking mold halves together are disclosed in U.S. Pat. Nos. 4,315,727 and 4,372,738. Each of the above-listed patents is currently owned by the assignee of the present invention. Although the locking mechanisms disclosed in U.S. Pat. Nos. 4,315,727 and 4,372,738 are very effective, they do require a rather complicated procedure to be followed when it is desired to remove an injection mold with one type of mold cavity configuration provided therein from the turntable and replace it with another one having a different mold cavity configuration therein. This becomes extremely important in situations where a single turntable may have a plurality of different injection molds mounted thereon, each injection mold having a different mold cavity configuration therein. If it is desired to replace one or more of the several injection molds mounted on the turntable, the whole system will be down for an inordinate period of time while the complicated procedure is being followed to facilitate a change in the injection molds.

Further, when the various ones of the injection molds are being replaced, care has to be exercised to make sure that the new mold so placed on the turntable will become properly aligned with the mold top lifting structure. Failure to properly align the new injection mold may result in the mold top being inadvertently dropped due to an inadequate engagement thereof with the top of the mold, as might occur through a use of the mold top lifting device shown in FIGS. 6 and 7 of U.S. Pat. No. 4,424,015.

Further, it is desirable to limit the spacing that will occur between the multiple parts of an injection mold, namely, an injection mold having, for example, three such parts. Use of such a mold would permit at least one component to be molded between the first and second mold parts while, and simultaneously therewith, a second component was being molded between the second and third parts. During an opening of the injection mold having plural mold parts, it is necessary to provide adequate spacing between the separated mold parts to enable an operator to reach in between the separated mold parts to remove therefrom the molded component. While various and separate structures could be provided for accommodating a control of each of the desired functions mentioned above, it is desirable to minimize the provision of supplemental structure to facilitate a manufacturer of such a control at a minimum of expense.

Accordingly, it is an object of the invention to provide a mold structure adapted to be mounted onto a turntable and have a capability of effecting an opening of the mold in a safe and secure manner.

It is a further object of this invention to provide a mold structure, as aforesaid, which has plural parts and structure for effecting a predetermined separation between the mold parts upon an opening of the mold structure.

It is as further object of the invention to provide a mold structure, as aforesaid, wherein the mold locking structure and the structure for effecting a separation between the plural components of a mold to a predetermined spacing are integrated into a compact arrangement.

SUMMARY OF THE INVENTION

The objects and purposes of the invention, including those set forth above, are met by providing a mold structure having at least first, second and third mold parts stacked one on top of the other, each having structure thereon defining at least one part of a mold cavity. The second part is oriented between the first and third parts and has mold cavities on both sides thereof. A support structure is provided for supporting the first mold part for movement toward and away from the third mold part. Structure is included within the mold structure to limit the spacing between the first and second mold parts to a prescribed spacing so that as the first mold part is moved away from the third mold part, the second mold part will be spaced a prescribed distance away from both the first and third mold parts.

The objects and purposes of the invention are also met by providing a mold opening structure which is coaxially aligned with the elongate tie rod extending between the mold parts. This structure further effects a safe and positive opening of the mold structure.

BRIEF DESCRIPTION OF THE DRAWINGS

Other objects, purposes and advantages of the present invention will be apparent to persons familiar with apparatus of this general type upon reading the following specification and inspecting the accompanying drawings, in which.

Figure 1:
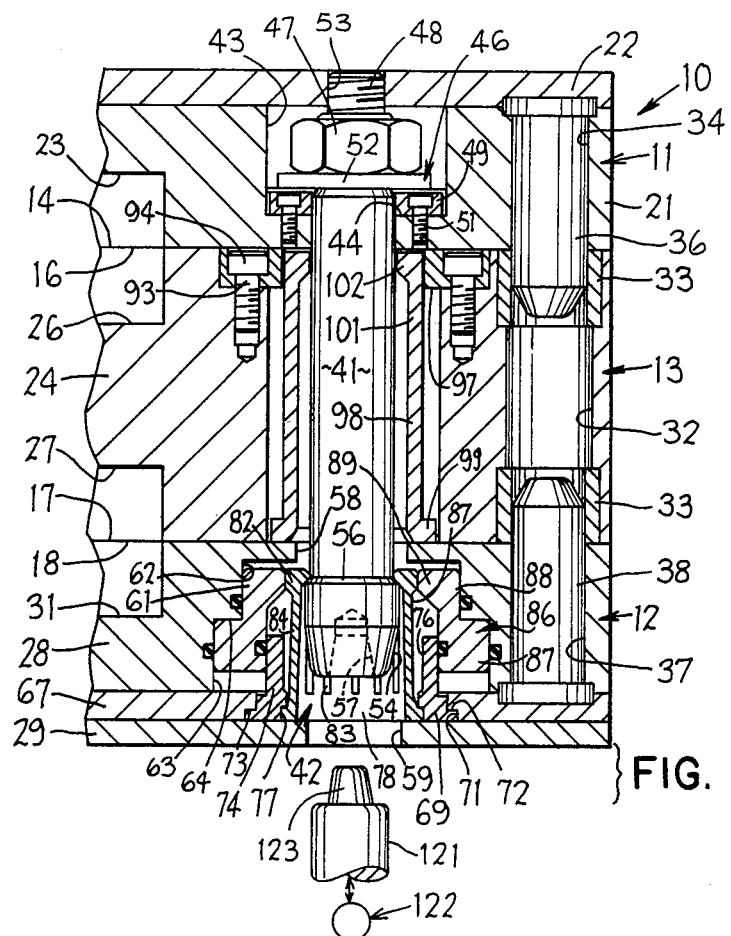
FIG. 1 is a fragmentary sectional view of a first embodiment of a mold structure embodying the invention, which mold structure is shown in the locked condition.

Certain terminology will be used in the following description for convenience in reference only and will not be limiting. For example, the words "up" and "down" will designate directions in the drawings to which reference is made. The words "in" and "out" will respectively refer to the directions toward and away from the geometric center of the injection mold and designated parts thereof. Such terminology will include the words specifically mentioned above, derivatives thereof and words of similar import.

DETAILED DESCRIPTION

FIG. 1 to 4 illustrate a fragment of an injection mold, designated generally by the reference numeral 10. The injection mold 10 is preferably utilized in a machine having a plurality of such injection molds secured to the top of a turntable at spaced intervals, such as is disclosed in U.S. Pat. Nos. 4,111,623 and 4,424,015 and in my application entitled MOLD MOUNTING AND RELEASABLE CLAMP THEREFOR, filed in the U.S. Patent and Trademark Office on Oct. 10, 1984 (Ser. No. 659,377 filed 10/10/1984). However, and in actuality, the mold structure is particularly adapted for use with the turntable and mold support structure thereon disclosed in my aforementioned application filed on Oct. 10, 1984.

Figure 4:
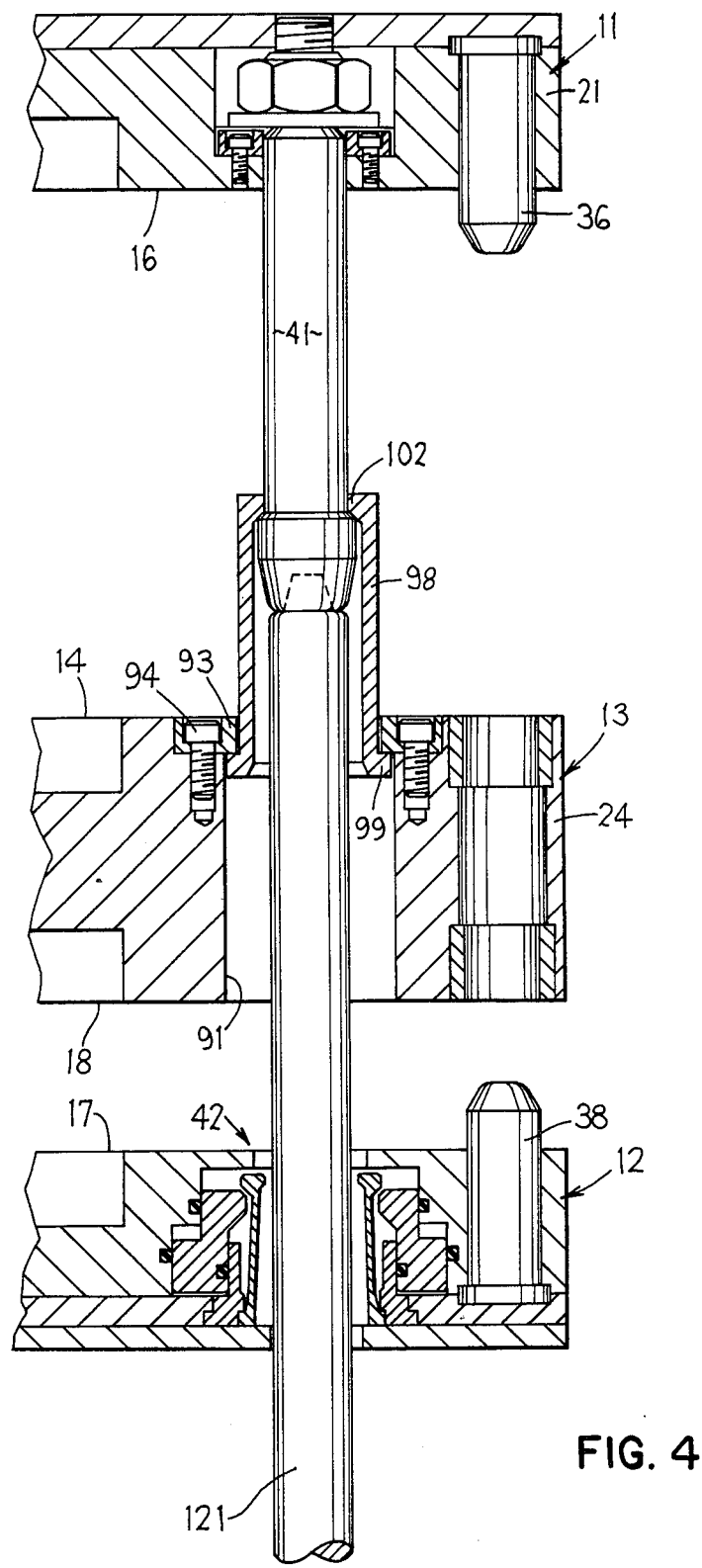
FIG. 4 is a fragmentary sectional view similar to FIG. 3 but illustrating the mold structure in a further opened condition.

The injection mold 10 comprises an upper mold part 11 and a lower mold part 12 having an intermediate mold part 13 disposed between the upper mold part 11 and the lower mold part 12. The upper mold part 11 is movable vertically with respect to the lower mold part 12 between a closed position wherein the planar surfaces 14 and 16 between the upper mold part 11 and the intermediate mold part 13 as well as the planar surfaces 17 and 18 between the intermediate mold part 13 and the lower mold part 12 are in engagement with each other as shown in FIG. 1, and an open position wherein the planar surfaces 14, 16 and 17, 18 are spaced vertically from one another as shown in FIG. 4. The vertical movement of the upper mold part 11 relative to the intermediate mold part 13 and the lower mold part 12 is effected by structure which will be explained in more detail below.

The upper mold part 11 comprises an upper mold member 21 and a top plate 22. The top plate 22 is secured to the top of the upper mold member 21 by a plurality of fasteners, not illustrated. The upper mold member 21 has a recess 23 therein adapted to receive a cavity plate therein, which cavity plate is not specifically shown in the drawings but is shown in the aforementioned U.S. Pat. Nos. 4,315,727 and 4,372,738.

The intermediate mold part 13 comprises an intermediate mold member 24 having on oppositely facing sides thereof, namely, on the upper planar surface 14 as well as the lower planar surface 18, recesses 26 and 27 adapted to receive therein a cavity plate of the aforementioned type.

The lower mold part 12 comprises a lower mold member 28 and a bottom plate 29. The upper planar surface 17 of the lower mold member 28 has a recess 31 therein adapted to receive therein a lower cavity plate of the abovementioned type.

The cavity plates received in the opposed recesses 23 and 26 serve to facilitate a molding of a product of a desired shape. Similarly, the cavity plates received in the opposed recesses 27 and 31 also facilitate the molding of a product. The two products can be one and the same or they can be different. It is imperative that the upper mold part 11 and the intermediate mold part 13 be capable of a relative movement with respect to each other as well as with respect to the lower mold part 12 to facilitate the removal of the products so formed in the operatively cooperable cavity plates.

To facilitate a guiding movement of the intermediate mold part 13 relative to the movement of the upper mold part 11 and the lower mold part 12, appropriate guide structure is provided therefor. More specifically, the intermediate mold part 13 has several bores 32 extending therethrough and, in this particular embodiment, adjacent the peripheral edge wall of the mold part. The bores 32 are enlarged at their opposite ends and have received in the enlarged ends bushing members 33, each having a predetermined and closely maintained internal diameter.

The upper mold part 11 and the lower mold part 12 each have a bore extending therethrough in axial alignment with the bore 32 in the intermediate mold part 13. More specifically, the upper mold part 11 has a bore 34 extending therethrough. A guide pin 36 is received in the bore 34 and is prevented from movement relative to the upper mold part 11. The guide pin 36 projects downwardly beyond the planar surface 16. The outer diameter of the guide pin 36 is machined to a prescribed close tolerance fit with the internal diameter of the bushing to enable its snug receipt in the bushing 33. Thus, and when the planar surfaces 14 and 16 are in engagement with each other, the guide pins 36, operatively received in the bushing members 33, will effect a proper alignment of the mold cavity plates received in the recesses 23 and 26 to facilitate the molding of a product in the cavity of the engaged mold cavity plates.

Similarly, the lower mold part 12 has a bore 37 extending therethrough and receiving therein a guide pin 38. The guide pin 38 is fixedly oriented with respect to the lower mold part 12 with one end thereof projecting upwardly beyond the planar surface 17 and being received in the adjacent one of the bushing members 33. As with the guide pin 36 and adjacent bushing member 33, a close tolerance is maintained between the opening in the bushing member 33 and the outer diameter of the guide pin 38 to accurately position the intermediate mold part 13 with respect to the lower mold part 12 when the planar surfaces 17 and 18 are in engagement with each other.

As shown in FIG. 1, the mechanism for locking together the mold parts 11, 12 and 13 includes plural cylindrical tie rods 41, only one of which is illustrated in FIGS. 1 to 4. Associated with each tie rod is a lock assembly 42, each cooperable with a respective one of the tie rods 41. The tie rods 41 will now be described in detail, and then the lock assembly 42 will be described in detail.

As illustrated in FIG. 1, each tie rod 41 is disposed in a cylindrical bore 43 extending vertically through the upper mold member 11. The lower portion of the bore 43 is provided with a vertically extending keyway, not illustrated, and the rotation of the tie rod 41 with respect to the upper mold member 21 is prevented by a key, also not illustrated, received in the keyway and engaged in a recess provided in the surface of the tie rod 41. The upper portion of the bore 43 is of a larger diameter than the lower portion thereof, resulting in an upwardly facing annular shoulder 44. Movement of the tie rod 41 with respect to the upper mold member 21 is prevented by a washer structure 46 encircling the tie rod 41 and disposed against the shoulder 44 of the upper mold member 21, and a nut 47 threadedly engaging the threaded upper end 48 of the tie rod 41. Adjusting the position of nut 47 permits adjustment of the vertical position of the tie rod 41 relative to the mold member 21. The threaded upper end 48 also extends through an opening 53 in the top plate 22.

In this particular embodiment, the washer structure 46 includes a pair of washers, one washer 49 being fixedly secured to the upper mold member 21 by a plurality of screws 51 as well as a conventional washer member 52 resting on the upper surface of the washer member 49. As shown in FIG. 1, the heads of the screws 51 are received in countersunk portions of openings extending through the washer member 49.

The tie rod 41 is provided with a tapered lower end surface 54. Spaced slightly upwardly from the end surface 54 is an annular lock shoulder 56 which encircles the tie rod 41. In other words, the lower end of the tie rod 41 is enlarged and the lock shoulder 56 is the surface that extends between the smaller diameter portion of the tie rod 41 and the larger diameter portion thereof. Further, a socket 57 having preferably tapered sidewalls is provided in the axial end of the tie rod 41 remote from the threaded end portion 48.

The lock assembly 42 will now be described. As illustrated in FIG. 1, a vertical lock bore 58 extends through the lower mold member 28 and opens outwardly through an opening 59 in the bottom plate 29. The opening 59 is preferably axially aligned with the lock bore 58. Further, the lock bore 58 is coaxially aligned with the bore 43 in the upper mold member 21. The bore 58 opens downwardly into a cylindrical recess 61 provided in the lower mold member 28. The recess 61 is coaxial with the bore 58 and has an upper part 62 and a lower part 63, the upper part 62 being of lesser diameter and axial length than the lower part 63, thereby defining a downwardly facing annular shoulder 64.

A hollow cylindrical collet holder 69 has its lower end snugly disposed in a bore 71 in an intermediate plate 67 oriented between the bottom plate 29 and the lower mold member 28. The collet holder 69 has an upwardly facing annular shoulder 72 which engages a downwardly facing annular shoulder 73 of the bore 71. The lower end of the collet holder 69 is disposed against the top of the bottom plate 29. The collet holder is thus fixed against movement in the direction of its axis relative to the lower mold part 28. The collet holder 69 has an upwardly extending cylindrical portion 74 with an inner surface 76 which tapers generally upwardly and outwardly. An annular recess 77 is provided in the inside portion of the collet holder adjacent the bottom plate 29.

Coaxially disposed within the collet holder 69 is a generally cylindrical collet sleeve 78. The collet sleeve 78 is coaxially aligned with the tie rod 41 and has a radially outwardly extending annular flange 79 at the lower end thereof which is snugly received within the annular recess 77 in the collet holder 69. The lower end of the collet sleeve 78 is disposed against the top of the bottom plate 29. The collet sleeve 78 is thus fixed against movement in the direction of its axis relative to the lower mold part 28.

The collet sleeve 78 has an axial length which is greater than that of the collet holder 69 and has an upwardly and inwardly tapering outer surface 81 at the upper end thereof which is preferably the surface of a conical frustum. A plurality of circumferentially spaced, axially extending slots 83 are provided in the walls of the collet sleeve 78, each extending from the upper end of the collet sleeve to a location near the bottom of the annular flange 79. The slots 83 define a plurality of axially extending arms 84 which are resiliently flexible in a radially outward direction. Each of the arms has a radially inwardly projecting locking member 82 thereon adjacent the upper end thereof. The distance between the radially inner surfaces on the locking members 82 on diametrically opposite sides of the collet sleeve 78 is normally somewhat less than the diameter of the tie rod 41 above the lock shoulder 56 but are movable due to the flexibility of the arms 84 to a greater spacing to enable the enlarged head on the tie rod 41 to move therepast.

An annular piston 86 coaxially encircles the collet sleeve 78 and has an outwardly extending annular flange 87 at the lower end thereof which is disposed in the lower portion 63 of the recess 61. The flange 87 is slidingly received in the annular space defined by the cylindrical portion 74 of the collet holder 69 and the surface of the lower portion 63 of the recess 61. An upwardly extending segment 88 is provided on the piston 86 and has an inwardly extending flange 89 thereon. The piston 86 is reciprocal in the recess 61 between a lowermost limit defined by the upper surface of the intermediate plate 67 and an uppermost limit defined by the engagement of the upper surface of the flange 87 with the annular shoulder 64. When the piston 86 is in its uppermost position as illustrated in FIG. 1, the annular ring defined by the flange 89 will be sufficient to urge the locking members 82 on the upper ends of each of the arms 84 radially inwardly so that the locking members 82 are each disposed over the top of the lock shoulder provided on the tie rod 41. Similarly, when the piston is moved to its lowermost position (FIG. 2), the resiliency of each of the arms 84 will be sufficient to facilitate a flexing thereof away from the lock shoulder 56 to permit an upward movement of the tie rod 41 relative to the lower mold member 28.

A bore 91 is provided in the intermediate mold member 24 and is coaxial with the bores 43 and 58. The upper end of the bore 91 is counterbored as at 92 and receives therein an annular plate 93 secured by a plurality of screws 94. The diameter of the opening 96 through the annular plate 93 is less than the diameter of the bore 91. As a result, a downwardly facing shoulder 97 is defined by the portion of the annular plate 93 that extends radially inwardly from the wall of the bore 91.

Figure 2:
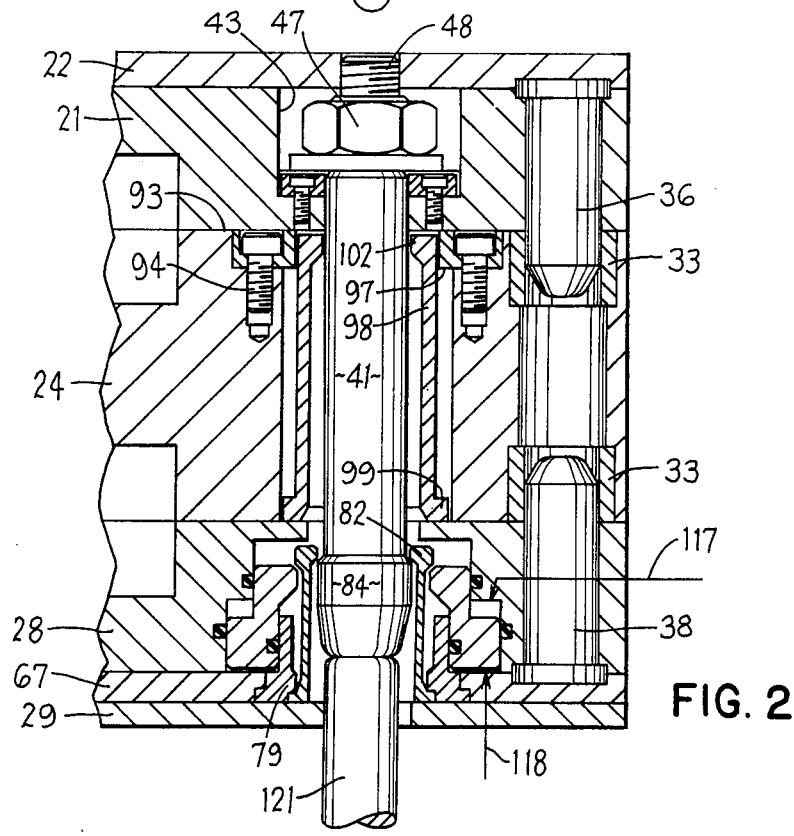
FIG. 2 is a fragmentary sectional view similar to FIG. 1 but with the mold structure being shown in the unlocked condition.
Figure 3:
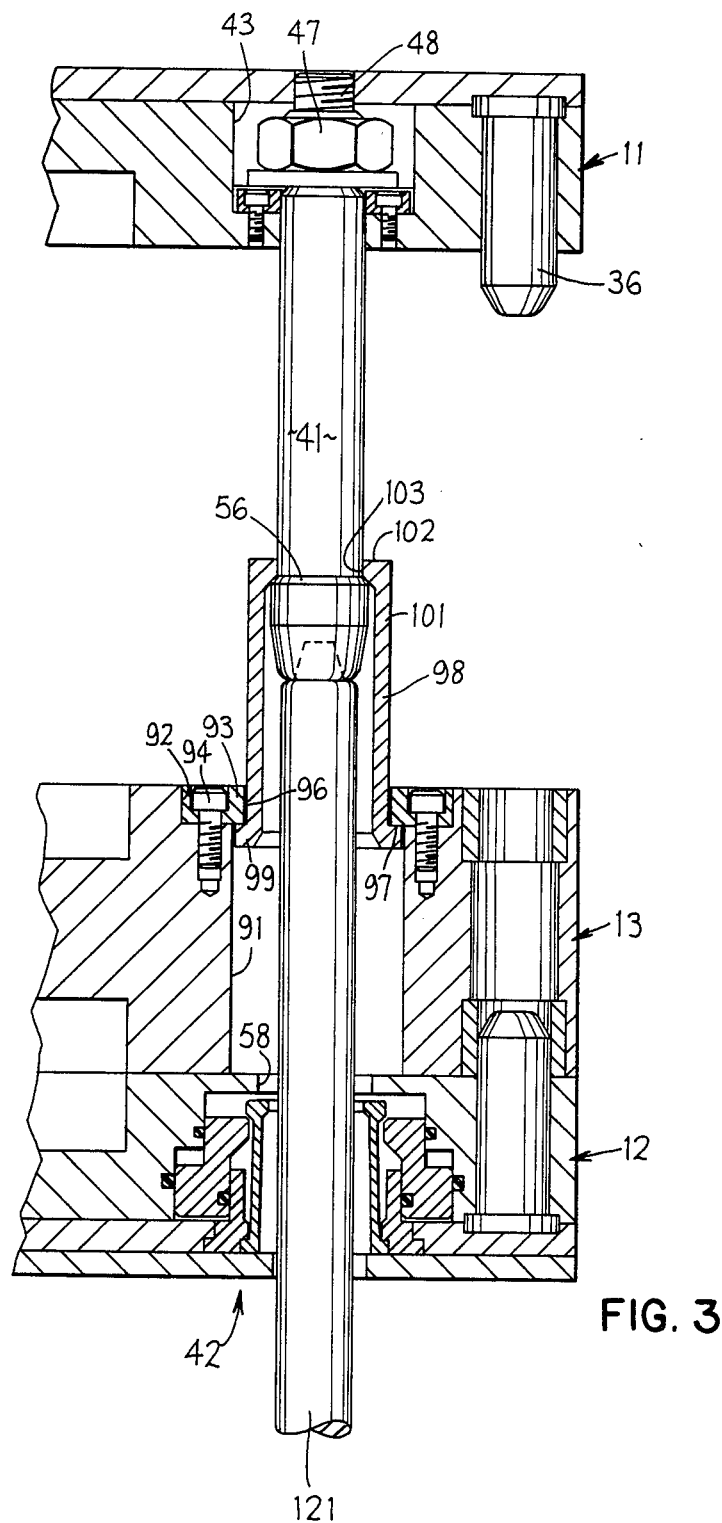
FIG. 3 is a fragmentary sectional view of a mold structure in the partially opened condition.

An elongate sleeve 98 is received in the bore 91 (FIGS. 1 and 2). The lower end of the sleeve 98 has a radially outwardly extending flange 99 thereon having an outer diameter greater than the inner diameter of the opening 96. The portion 101 of the sleeve 98 extending above the flange 99 is less in diameter than the diameter of the opening 96 so that the sleeve can move through the opening 96 to the position illustrated in FIG. 3 wherein the upper surface of the flange 99 engages the downwardly facing shoulder 97. The upper end of the sleeve 98 has a radially inwardly extending flange 102 defining an opening 103 which is less in diameter than the diameter of the enlarged end on the lower end of the tie rod 41. Thus, as the tie rod 41 moves vertically toward the position illustrated in FIG. 3, the enlarged end on the tie rod 41, particularly the lock shoulder 56 thereon, will engage the bottom surface of the flange 102 and effect an upward movement of the sleeve 98 therewith until the radially outwardly extending flange 99 on the lower end thereof engages the downwardly facing shoulder 97. Thereafter, a continued upward movement of the tie rod 41 will effect a separation of and an upward movement of the intermediate mold member 24, as illustrated in FIG. 4, away from the lower mold member 28. Thus, the sleeve 98 effects a greater spacing between the upper mold member 21 and the intermediate mold member 24 than would otherwise be possible.

Figure 7:
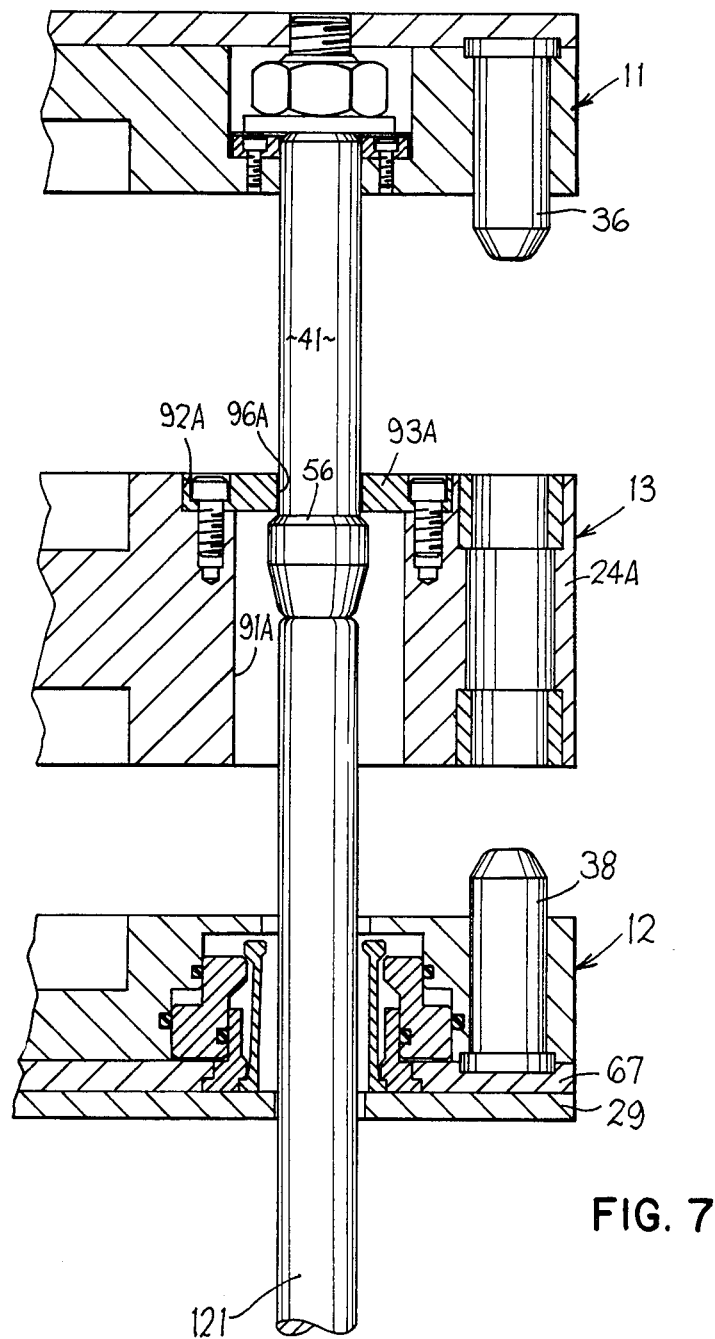
FIG. 7 is a fragmentary sectional view of a third embodiment of a mold structure embodying the invention, which mold structure is in a partially opened condition.

In this regard, reference is to be made to FIG. 7 which is identical in most respects to the illustration in FIG. 4 except that no elongate sleeve 98 is provided. Instead, a modified annular plate 93A is secured in the countersunk portion 92A in the upper end of the bore 91A and has an opening 96A therethrough which is less in diameter than the diameter of the enlarged head on the end of the tie rod 41. Thus, as the tie rod moves vertically upwardly, the enlarged head, particularly the lock shoulder 56 thereon, will engage the bottom edge of the opening 96A to effect a lifting of the intermediate mold member 24A. A comparison of FIGS. 4 and 7 will immediately indicate the difference in spacing that can be achieved by the provision of a sleeve 98.

A continued upward movement of the tie rod 41 will further separate the intermediate member 24 from the lower mold member 28 to enable the operator to reach in with the hands or with a tool to effect the removal of any part so molded in the cavity plates and which is not properly ejected during the mold opening procedure.

Figure 5:
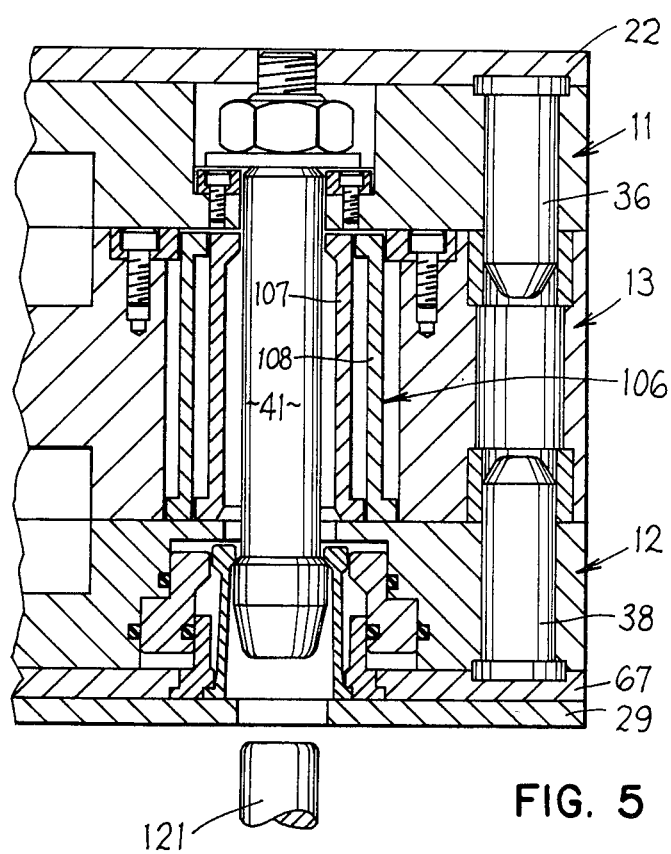
FIG. 5 is a fragmentary sectional view of a second embodiment of a mold structure embodying the invention.
Figure 6:
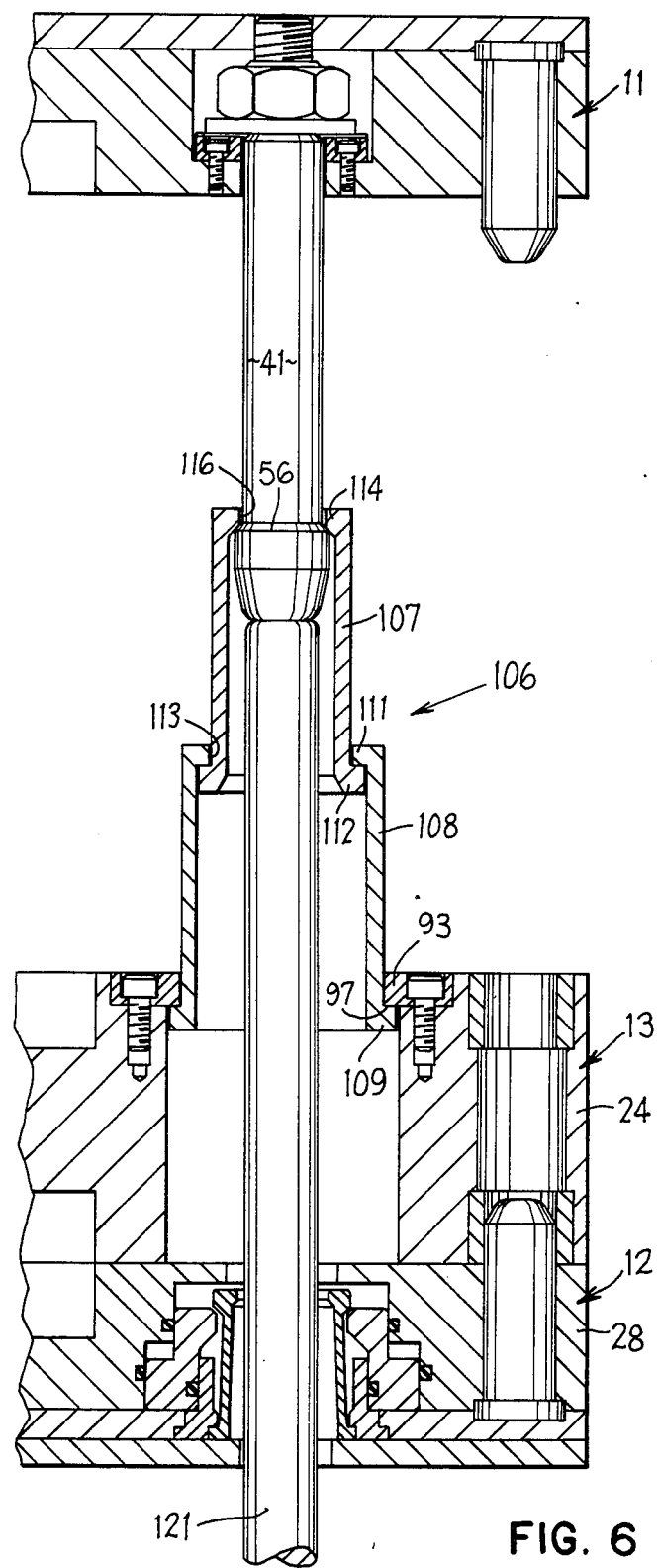
FIG. 6 is a fragmentary sectional view of the mold structure showing the mold structure in a partially opened condition.

If a larger spacing is required between the upper mold member 21 and the intermediate mold member 24, a modified elongate sleeve arrangement 106 (FIGS. 5 and 6) can be provided. In this particular embodiment, a pair of such sleeve 107 and 108 are positioned in telescoping relation with respect to each other. The sleeve 108 has a radially outwardly extending flange 109 on the lower end thereof and a radially inwardly extending flange 111 on the upper end thereof. The radially outwardly extending flange 109 is adapted to cooperate with the downwardly facing shoulder 97. The sleeve 107 also has a radially outwardly extending flange 112 on the lower end thereof and an outer diameter which is greater than the inner diameter of the opening 113 defined by the radially inwardly extending flange 111 on the upper end of the sleeve 108. A radially inwardly extending flange 114 is provided on the upper end of the sleeve 107 and has an opening 116 defined thereat which is less in diameter than the outermost diameter of the lock shoulder 56 provided on the tie rod 41. Thus, as the tie rod 41 is moved vertically upwardly, the lock shoulder 56 will engage the bottom surface of the radially inwardly extending flange 114 on the sleeve 107 to effect a movement of the sleeve 107 vertically upwardly therewith. A continued vertically upward movement of the sleeve 107 will eventually bring the flange 112 into engagement with the under surface of the flange 111 on the sleeve 108. A continued further upward movement of the tie rod 41 will effect an upward movement of the sleeve 108 until the flange 109 engages the downwardly facing shoulder 97 on the intermediate mold member 24. Thus, a continued upward movement of the tie rod 41 will effect a separation of the intermediate mold member 24 from the lower mold member 28.

As stated above, the mold structure described above is mounted onto a turntable, preferably of the kind illustrated in my aforementioned copending application filed on Oct. 10, 1984 (Ser. No. 659,377 filed 10/10/1984). In this instance, space is provided beneath the turntable, or beneath the mold structures at a certain indexed location of each mold during its travel with the turntable, for the provision of a vertically upwardly movable drive member 121 (FIG. 1). In this particular embodiment, the drive member 121 is a rod of a hydraulic cylinder arrangement schematically illustrated at 122 in FIG. 1. The hydraulic cylinder arrangement 122 effects a reciprocal drive of the drive member 121 in a direction that is coaxial to the tie rod 41. The upper end of the drive member 121 has a tapered fitting 123 thereon adapted to be received into the socket 57 on the lower end of the tie rod 41. The drive member 121 is axially aligned, therefore, with the tie rod 41 and is drivable through the opening 59 in the bottom plate 29 so that the fitting 123 will be received in the socket 57.

It will be evident from the foregoing discussion that the piston 86 is drivable between its vertical limits by a pneumatic circuit schematically represented by the arrows 117 and 118 in FIG. 2. A supply of pressurized gas to the line schematically represented by the arrow 117 will drive the piston downwardly to unlock the mold. Similarly, the supply of a pressurized gas to the line schematically represented by the arrow 118 will effect a movement of the piston 86 upwardly to the locked position illustrated in FIG. 1. This, by the way, is the same way that the mold is locked and unlocked in U.S. Pat. No. 4,372,738.

Figure 8:
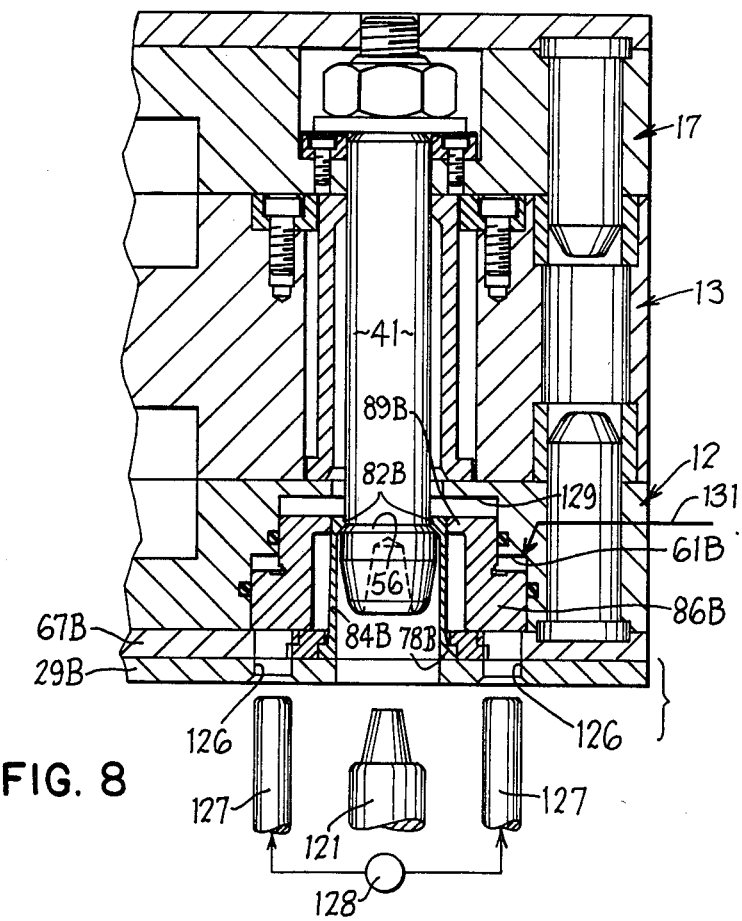
FIG. 8 is a fragmentary sectional view of a fourth embodiment of a mold structure embodying the invention and with the mold structure being in the closed and locked condition.
Figure 9:
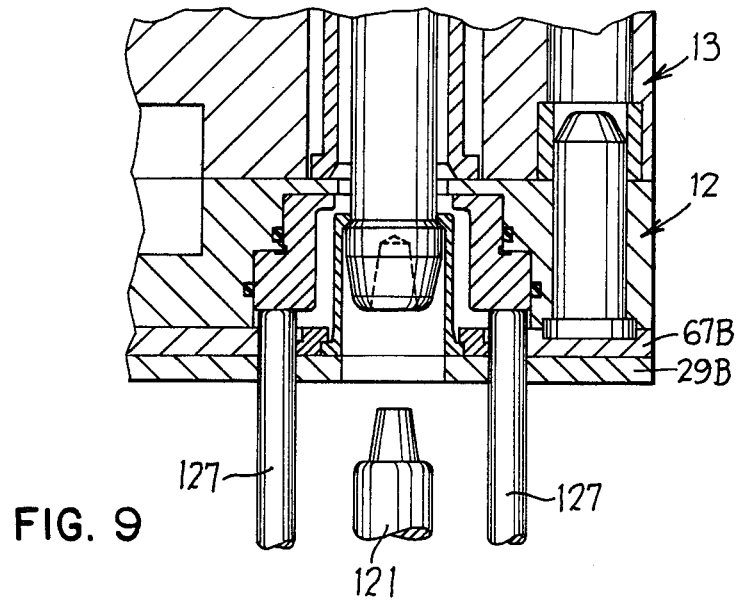
FIG. 9 is a fragmentary sectional view of the embodiment of FIG. 8 but with the mold structure being in the unlocked condition.

In the embodiment illustrated in FIGS. 8 and 9, the pneumatic circuitry described in the preceding paragraph is not provided. Instead, a pair of openings 126 are provided in the intermediate plate 67B and bottom plate 29B, which opening communicates with the lower portion 63B of the recess 61B. A pair of vertically drivable drive members 127 are provided and are driven vertically upwardly by a schematically illustrated hydraulic or pneumatic arrangement 128 to push the piston 86B vertically upwardly. It is to be noted that in this particular embodiment, a vertical upward movement of the piston will effect an unlocking of the locking arrangement (see FIG. 9) due to the additional space provided between the upper ends of the arms 84B or locking members 82B on the collet sleeve 78B and the downwardly facing surface 129 of the upper wall of the recess 61B. However, when it is desired to lock the mold parts together, air is supplied through the schematically illustrated passageway 131 to urge the piston 86B downwardly until the flange 89B urges the lock members 82B on the upper end of each of the arms 84B radially inwardly into locking arrangement with the lock shoulder 56 on the tie rod 41. If desired, the drive member 121 and the drive members 127 can be located at the same station to which the turntable has been indexed or these members can be located at separate stations, the drive member 127 effecting an unlocking of the lock assemblies prior to a movement of the turntable to bring the lock assembly and axially aligned tie rod 41 into coaxial relation with the drive member 121.

It is to be noted that the frictional engagement between the elastomeric O-ring seals operatively provided on and engaging the piston 86B will hold the piston 86B in its uppermost position. Further, the radially outward spring action on each of the arms 84B of the collet sleeve 78B are sufficient to hold the piston 86B in its vertically elevated position during a travel of the mold from the position wherein the lock assemblies have been unlocked to the position wherein the drive member 121 moves upwardly through the opening 59 and into engagement with the lower end of the tie rod 41.

The operation of the lock assemblies and the manner in which the mold parts are separated have been described in detail above and further description of the operation is believed unnecessary since it would be only redundant of material already set forth above. The manner in which the mold parts are separated from each other by reason of a drive member 121 entering an opening 59 in the bottom of the mold and being hydraulically driven upwardly will prevent the mold parts from suddenly collapsing on one another and entrapping an operator's arm, for example, or any tool that may be disposed between the mold parts during the mold opening process.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold structure, comprising:
 first, second and third mold parts stacked one on top of the other, each having first means thereon defining at least a part of a mold cavity, said second part being oriented between said first and third parts and having said first means on both sides thereof;
 support means for supporting said first mold part for movement toward and away from said third mold part;
 an elongate tie rod extending between said first and third mold parts and through an opening in said second mold part, said tie rod being supported on said first mold part by first mounting means, said tie rod having first locking means thereon at a location spaced from said first mold part;
 second locking means provided on said third mold part and cooperable with said first locking means on said tie rod for preventing lengthwise movement of said tie rod relative to said third mold part, said second locking means including second means defining an opening through said third mold part axially aligned with said tie rod;
 stop means secured to said second mold part and positioned to operatively engage said first locking means for limiting the spacing between said first and second mold parts to a prescribed spacing so that as said first mold part and said tie rod secured thereto are moved away from said third mold part, said first locking means on said tie rod will engage said stop means to effect a movement of said second mold part away from said third mold part; and
 extendible drive means axially aligned with said tie rod and receivable in said opening for engaging said tie rod to effect a movement of said first mold part and said tie rod away from said third mold part.

2. The mold structure according to claim 1, wherein said first locking means includes an enlarged end on said tie rod remote from said first mold part, and wherein said stop means includes an annular plate means encircling said tie rod and having an opening therethrough that is smaller than the diameter of said enlarged end so that a continued movement of said first mold part and said tie rod away from said third mold part will cause said enlarged end to engage said annular plate means to thereby effect a prescribed spacing between said first and second mold parts as they together move away from said third mold part.

3. The mold structure according to claim 1, wherein said first locking means includes an enlarged end on said tie rod remote from said first mold part, and wherein said stop means includes an annular plate means encircling said tie rod, wherein said first locking means further includes an elongated sleeve means having an enlarged end on one end engageable with said annular plate to thereby prevent removal of said sleeve means from the opening through said annular plate means, said sleeve means having an opening at the other end thereof with a diameter less than the diameter of said enlarged end so that said sleeve facilitates a lengthening of said prescribed spacing.

4. The mold structure according to claim 3, wherein said sleeve means includes a pair of telescoping sleeves movable with respect to each other and with respect to said second mold part, each said sleeve having an enlarged end at one end and an opening at the other end thereof, said opening in a smaller diameter one of said sleeves having a diameter less than the diameter of said enlarged end and an enlarged end larger than said opening in a larger diameter one of said sleeves, said enlarged end in said larger diameter one of said sleeves being larger in diameter than said diameter of said opening in said annular plate so that said sleeves in an extended relation relative to each other will facilitate a lengthening of said prescribed spacing.

5. The mold structure according to claim 1, wherein said extendible drive means includes a guide tip on the end thereof facing said tie rod, and wherein said tie rod has a socket on the end thereof facing said guide tip and being adapted to receive said guide tip therein.

6. The mold structure according to claim 1, wherein said first, second and third mold parts each include guide means adapted to cooperate with said guide means on the next adjacent mold part.

7. The mold structure according to claim 1, wherein said second locking means includes a plurality of locking members disposed at angularly spaced locations about the axis of said tie rod and supported for movement toward and away from said tie rod axis between retracted and locking positions, said tie rod being received between said locking members when said mold parts are engaging each other in a closed position, and a selectively actuable means for resisting movement of said locking members away from said locking position.

8. The mold structure according to claim 7, wherein said selectively actuable means includes means defining a piston chamber, a piston supported for reciprocal movement in said chamber and operatively coupled to said locking members and means for selectively supplying pressurized fluid to said piston chamber on at least one side of said piston for effecting a movement of said piston in said chamber to lock said locking members into a locking relation with said tie rod.

9. The mold structure according to claim 8, wherein said chamber has means therein defining a further opening extending parallel to the first mentioned opening, and wherein said selectively actuable means further includes a second extendible drive means receivable into said further opening for moving said piston in said chamber to an unlocking relation with said locking members.

10. The mold structure according to claim 8, wherein said means for selectively supplying pressurized fluid includes additional means for supplying said pressurized fluid to said piston chamber on opposite sides of said piston for effecting reciprocal movement of said piston between locking and unlocking relation with said locking members.

11. A mold structure, comprising:
first and second mold parts stacked one on top of the other, each having first means thereon defining at least a part of a mold cavity;
support means for supporting said first mold part for movement toward and away from said second mold part;
an elongate tie rod extending between said first and second mold parts, said tie rod being supported on said first mold part by first mounting means, said tie rod having first locking means thereon at a location spaced from said first mold part;
second locking means provided on said second mold part and cooperable with said first locking means on said tie rod for preventing lengthwise movement of said tie rod relative to said second mold part, said second locking means including second means defining an opening through said second mold part axially aligned with said tie rod; and
extendible drive means axially aligned with said tie rod and receivable in said opening for engaging said tie rod to effect a driving movement of said first mold part and said tie rod away from said second mold part.

12. The mounting structure according to claim 11, wherein said second locking means includes a plurality of locking members disposed at angularly spaced locations about the axis of said tie rod and supported for movement toward and away from said tie rod axis between retracted and locking positions, said tie rod being received between said locking members when said mold parts are engaging each other in a closed position; and wherein a selectively actuable means is provided for resisting movement of said locking members away from said locking position.

13. The mold structure according to claim 12, wherein said selectively actuable means includes means defining a piston chamber, a piston supported for reciprocal movement in said chamber and operatively coupled to said locking members, and means for selectively supplying pressurized fluid to said piston chamber on at least one side of said piston for effecting a movement of said piston in said chamber to lock said locking members into a locking relation with said tie rod.

14. The mold structure according to claim 13, wherein said chamber has means therein defining a further opening extending parallel to said first mentioned opening, and wherein said selectively actuable means further includes a second extendible drive means receivable into said further opening for moving said piston in said chamber to an unlocking relation with said locking members.

* * * * *